United States Patent [19]
Cao et al.

[11] Patent Number: 6,117,625
[45] Date of Patent: Sep. 12, 2000

[54] METHOD AND APPARATUS FOR CREATING A COMPOSITE IMAGE BY THE TILING OF MULTIPLE IMAGE FRAMES

[75] Inventors: Fred F. Cao, Richmond, Canada; Larry Hsu, Blaine, Wash.; Daryl Gordon James, Burnaby, Canada; Kevin MacArthur, Delta, Canada; Wendy Macura, West Vancouver, Canada; Derek G. Montgomery, New Westminster, Canada; John A. Nelson; Stephen A. Pavelick, both of Bellingham, Wash.; Gary K. Pringle, Surrey; Alastair M. Reed, Delta, both of Canada; Matthew P. Rektor; Horst W. Schaaf, both of Bellingham, Wash.; Con Verburg, Delta, Canada

[73] Assignee: Cymbolic Sciences Inc., Bellingham, Wash.

[21] Appl. No.: 09/264,009

[22] Filed: Mar. 8, 1999

[51] Int. Cl.[7] ........................................ G03C 7/30
[52] U.S. Cl. .............................. 430/394; 430/22
[58] Field of Search ....................... 430/394, 22

[56] References Cited

U.S. PATENT DOCUMENTS

| | | | |
|---|---|---|---|
| 3,888,672 | 6/1975 | Lee | 430/394 |
| 5,432,044 | 7/1995 | Shimizu | 430/394 |

*Primary Examiner*—Hoa Van Le
*Attorney, Agent, or Firm*—Elbie R. de Kock

[57] ABSTRACT

A method of producing a composite image on an image recording medium from first and second component images, represented by digital image data, comprising the steps of converting the digital image data of each image into electromagnetic radiation image data; and forming the composite image by successively exposing the recording medium to the electromagnetic radiation image data of the first and second images so that the images are created on the medium in overlapping relationship to form a join region. The medium is doubly exposed, first by the image data of the first image and then by the image data of the second image. The intensity of the electromagnetic radiation representing the first image is progressively ramped off in the join region and the intensity of the electromagnetic radiation representing the second image is progressively ramped on in the join region.

11 Claims, 5 Drawing Sheets

METHOD AND APPARATUS FOR CREATING A COMPOSITE IMAGE BY THE TILING OF MULTIPLE IMAGE FRAMES

FIELD OF THE INVENTION

This invention relates to a method and apparatus for creating a composite image by the tiling of multiple image frames, such as for creating a large image on a photosensitive medium.

BACKGROUND OF THE INVENTION

Output of images to a photosensitive medium in an internal drum machine implies that the maximum image size is limited by the dimensions of the internal drum architecture. This also applies to writing swaths in a capstan drive or external drum imaging device.

One method of creating a larger image is to form a composite image by combining a plurality of multiple image frames. However, there are problems involved when using such a method, i.e. the correct alignment of the individual image frames with respect to each other, as well as to create a seamless join between adjacent frames.

It is an object of the present invention to alleviate the above-mentioned difficulties.

SUMMARY OF THE INVENTION

According to the invention there is provided a method of producing a composite image on an image recording medium from first and second component images, comprising the steps of forming the composite image by successively exposing the recording medium to electromagnetic radiation image data of the first and second images so that the images are created on the medium in overlapping relationship to form a join region in which the medium is doubly exposed, first by the image data of the first image and then by the image data of the second image, and wherein the intensity of the electromagnetic radiation representing the first image is progressively ramped off in the join region and the intensity of the electromagnetic radiation representing the second image is progressively ramped on in the join region.

The electromagnetic radiation may be in the form of a laser beam.

The method may further comprise the steps of determining the position of the first component image on the image recording medium by providing a reference mark, such as a hole, in the image recording medium and detecting the position of the reference mark for accurate location of the second component image relative to the first component image.

Further objects and advantages of the invention will become apparent from the description of preferred embodiments of the invention below.

BRIEF DESCRIPTION OF THE DRAWINGS

The invention will now be described, by way of examples, with reference to the accompanying drawings, in which.

DETAILED DESCRIPTION OF PREFERRED EMBODIMENTS

Internal drum imaging systems have the advantage of a consistent spot diameter over the entire frame of the image, resulting in consistent image quality. The disadvantage of these systems, however, is that the image size is limited by the geometrical dimensions of the platen used to mount the photographic medium. The latter is typically a rectangular sheet of about 51.5 inches long and 50 inches wide but not limited hereto, rolled up in the form of a cylinder inside the supporting platen. Typically, photosensitive media are provided in rolls of about 100 to 150 feet in length.

To obtain a larger image, it is necessary to join multiple image frames together, each of which are formed successively on the photosensitive medium. Successfully joining the images requires that there are no visible artifacts present in the join area.

The invention will be described by using the example of forming an elongate composite image by joining three successive component image frames together. The size of each image frame is dictated by the specific imaging device being used. In the present example, an internal drum imaging device is used but the method can be applied to joining image swaths in a capstan drive or external imaging device. The photosensitive medium being used is a continuous or half tone silver halide photographic material.

To create a seamless join between adjacent frames, the image frames are not joined together in an abutting relationship but in an overlap relationship where the images are blended. The blending implies that the light intensity of the first image frame being formed is ramped off towards the end, while the light intensity of the second image being formed is ramped on, as shown in FIG. 1, representing peak light intensity (I) along the vertical axis and position (x) along the horizontal axis.

The image frames created by the internal drum imaging device typically have a length of 51.5". While it is desirable to have the overlap region as broad as possible, there are obvious limitations to this in view of the picture size required. For example, to produce a composite picture having a length of 100", the overlap length in respect of each image frame is limited to 3".

Figure 1:
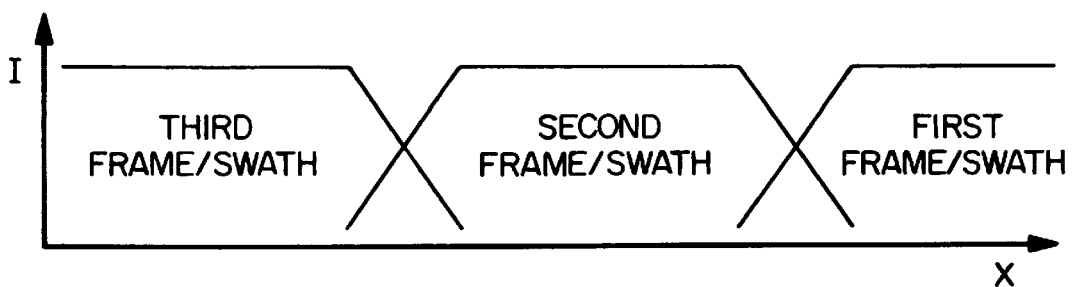
FIG. 1 is graphical illustration of overlap regions between adjacent image frames forming a composite image.

As shown in FIG. 1, the light intensities of the adjacent frames in the overlap are tapered. In the preferred embodiment, the taper is linear from zero intensity to maximum intensity and vice versa, except in the region where the zero and maximum values are approached. Here the taper is non-linear to avoid a sharp transition.

An example of a function which can be used for effecting the taper is:

$$\mathrm{erfc}(x) = \frac{2}{\sqrt{\pi}} \int_x^\infty e^{-t^2} dt$$

Figure 2:
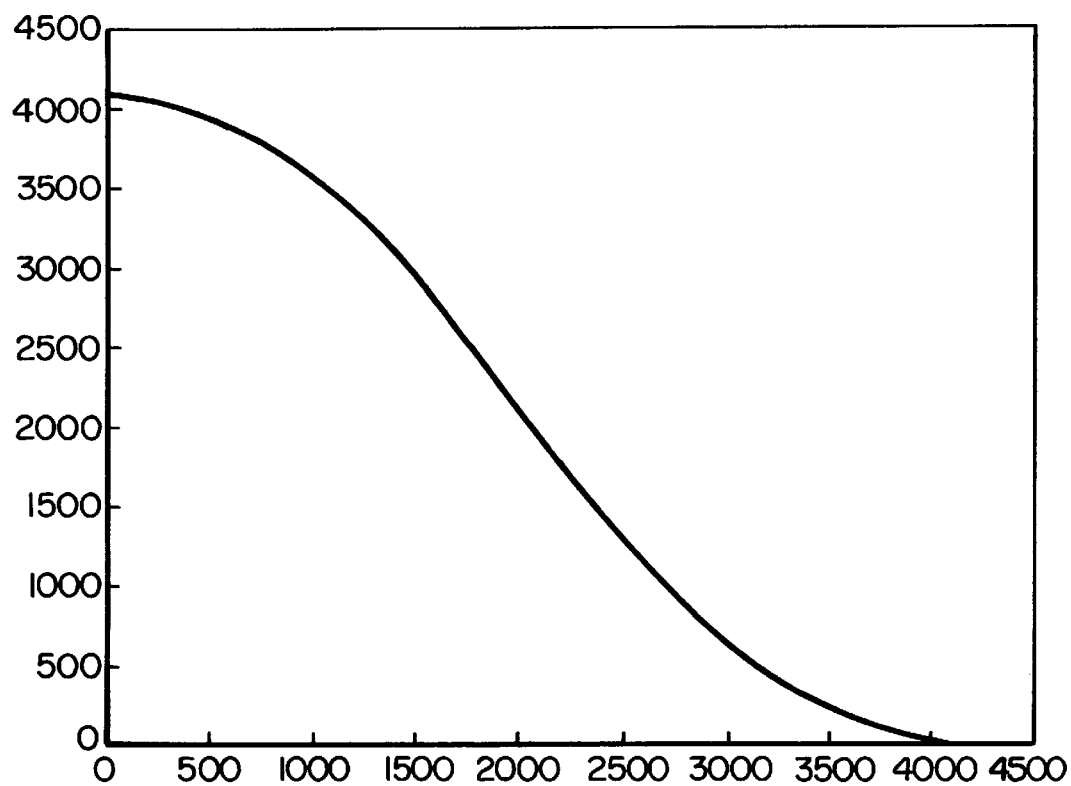
FIG. 2 is graphical illustration of a function for achieving a gradual reduction of light intensity of an image frame in an overlap region with an adjacent frame.

This function is plotted in FIG. 2.

The effect of this function is that the sum of the two functions in the overlap region add to 1.

To calculate the image density in the blend region, the input digital image data (ID) in the host computer is converted to light intensity data before being fed to the photographic printer, i.e. the image data is converted from image space to exposure space, since it has been found that two light exposure levels add approximately linearly on photographic material.

Figure 4:
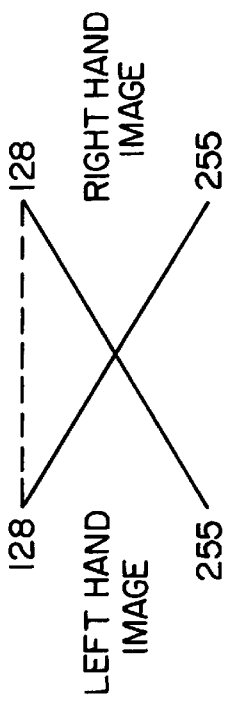
FIG. 4 is a graphical illustration of the exposure of a pixel on a photographic medium, with light intensity (I) along the vertical axis and exposure time (t) along the horizontal axis.

The image is composed of a multiplicity of picture elements (pixels). The exposure of an individual pixel is represented by E=I*t, where E is the total exposure on the photographic material, I is the peak light intensity and t is the exposure time. Each pixel is formed as a symmetrical peak with steep sides, as graphically illustrated in FIG. 4.

The sequence of the operations of the blending method can be illustrated symbolically as follows:

$$\{IDGE^{-1}*B(x)EG^{-1}\}\{GE\}$$

where,

ID is the input digital image data in the host computer;
G is the grey balance lookup table (LUT) of the printer in the frame used in the present example;
E is the video digital to analog conversion (DAC) response of the printer;
B(x) is the blend function (blend shape) as a function of the position, such as the function plotted in FIG. 2;
$G^{-1}$ is the inverse of the grey balance LUT in the printer; and
$E^{-1}$ is the LUT to obtain a linear light ramp from the printer.

The reason for the inverted tables $G^{-1}$ and $E^{-1}$ is to go in and out of exposure space. Since this approach is known to persons skilled in the art, it will not be described further here.

The first part of the operation, i.e. $\{IDGE^{-1}*B(x)EG^{-1}\}$ occurs in the host computer and the second part, i.e. {GE}, occurs within the LJ5000.

Figure 3:
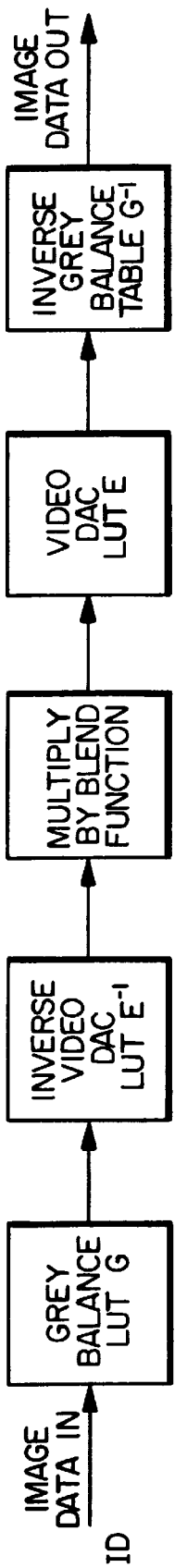
FIG. 3 is a flow diagram of a method of blending adjacent image frames in a composite image.

The first part which occurs within the host, i.e. the host processing, which will also be referred to as the first order correction is illustrated in FIG. 3.

As shown, the digital image data is input into the grey balance LUT, which as indicated above, corresponds with the grey balance table G in the printer. The output from G is input into $E^{-1}$ which is now in exposure space (as opposed to image space of the original input image data) is multipled by the blend function B(x) to obtain the down ramp or up ramp, as the case may be, depending on whether it is the first or second component image in time which is being processed. The result from the blend function operation is input into E, which, as indicated above, corresponds with the LUT in the photographic printer performing the digital to anologue conversion. The output from E is then input into $G^{-1}$.

The effect of the host processing is that the blending of the images is effected in exposure space or light space (where the image data corresponds to a light exposure level), as opposed to image space.

The output $G^{-1}$ is transferred from the host computer to the photographic printer and successively input into the LUT's G and E of the photographic printer and applied to the photographic medium by exposing the medium to the resultant laser beam modulated by the image data.

A blend shape is used such that the total exposure within the blend region is:

$$E(total)=E(left)+E(right)$$

where,

E(total) is the total exposure of the photosensitive material in the blend region;
E(left) is the material exposure within the blend region due to the left hand image; and
E(right) is the material exposure within the blend region due to the right hand image.

The exposure is split between the left hand and right hand images so that the total adds to the original image exposure value. Therefore, since, to a first approximation, light adds up linearly on the photographic material, the required density is achieved.

Figure 5:
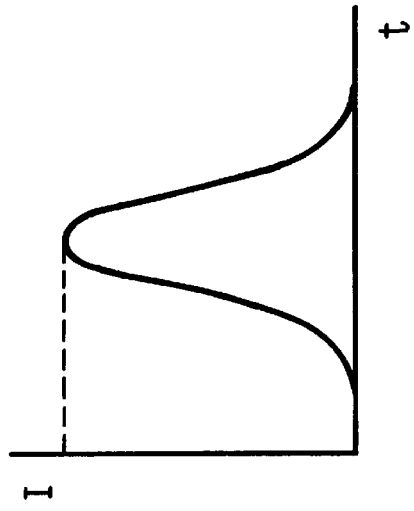
FIG. 5 is a graphical illustration of a mid-grey blend.

For example, FIG. 5 shows a mid-grey blend, resulting in a linear total exposure, as shown in broken lines.

In applying the blend function it has been found to be necessary to have greater than 8-bits accuracy in order to produce a blend with little or no artifacts. Since the image data is in 8-bits for each of the three primary colours, an error diffusion algorithm is used to modify 12-bit data to 8-bit data so that the blend function is applied on average at close to 12 bits accuracy. This renders an area more accurate than any one specific pixel of image data so that virtually 12 bits of accuracy is achieved on a given small area of the blend region. Thus, the blend data is 12-bit data and the resulting output image is once again 8-bit.

The error diffusion algorithm is based on the Floyd-Steinberg dithering technique. Each pixel is calculated to 12-bits of accuracy and the difference between the 12-bit calculated value and the actual 8-bit image data value is the error for that pixel. This error is then diffused to its nearest neighbours and added to the 12-bit calculated value of that neighbour when, once again, the difference between the 12-bit and 8-bit value is diffused to its neighbours. In this way pixel accuracy is increased by making an area of the image data become more accurate. Table 1 below illustrates the error propagation for a given pixel.

TABLE 1

| 0/16 | Pixel | 7/16 |
|------|-------|------|
| 3/16 | 5/16  | 1/16 |

The image blending method described above eases the registration requirements for two adjacent images in order to form a seamless join. However, it is still preferable that the adjacent image frames be aligned as accurately as possible, preferably to the nearest pixel, although less accurate registration can be tolerated under certain conditions, e.g. depending on the type of image.

Large width photographic media are supplied without fiduciary marks, like sprocket holes. It is therefore problematical to advance photographic media of 50 inches width with a positional accuracy of better than about 0.4" (10 mm) over a total advance of 50 inches.

Slippage of the photographic medium and uneven roller pressure can easily accumulate to more than 0.2" (5 mm) of location inaccuracy between frame advances of 50 inches in length. An error of about 0.2" (5 mm) corresponds with a 50 pixels dislocation.

Figure 6:
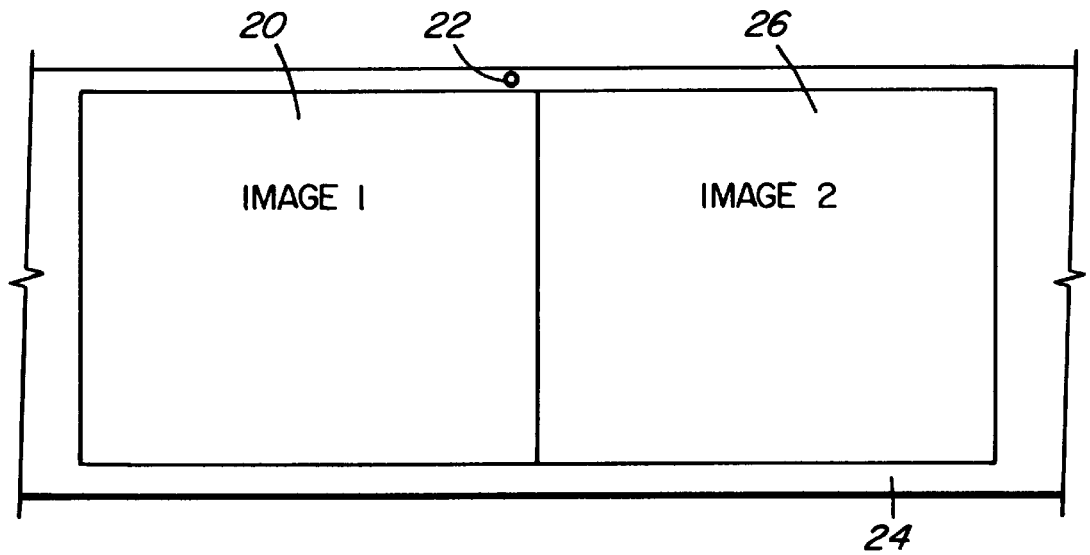
FIG. 6 shows part of a roll of a photographic material provided with a reference hole therein for the accurate placement of adjacent image frames.

In the present method a reference mark is provided, once the first image 20 has been scanned, by creating a small reference hole 22 at a position along the outer edge of the photographic medium 24, as shown in FIG. 6. The position of the hole 22 is detected by utilizing the scanning mechanism usually used to expose the photographic medium 24, to scan a red laser along the edge of the medium and detect the reflected light. The amount of reflected light changes according to the reflectivity of the surface onto which the laser is focused. Since the photographic medium and the platen have different reflectivities, it is possible to detect the reference hole 22 with ease. If desired, the process can be enhanced by mounting a highly reflective tape along the circumference of the platen, therefore increasing the amount of reflected light from the reference hole 22 significantly above the amount of light reflected by the photographic medium 24. The image of the reference hole is numerically evaluated and the centroid of the hole determined. The calculated location of the hole 22 is then used to shift the start of the scan for the second image 26 into the required location for correct tiling.

To avoid image artifacts, the reference hole 22 is preferably located outside the image area. In the present example the hole is located at a distance of about 0.2" (5 mm) from the edge of the medium along the scanning direction.

In order to prevent unnecessary exposure of the media, system timing is used to modulate the laser beam so that only a small portion of the media in the vicinity of the hole is exposed. The portion of the media over which the beam is modulated is centered on the nominal hole position. The exposed portion is large enough to find the hole over the range of expected media transport errors. For example, in this system, the beam is modulated over a 2.5"×2.5" (63.5× 63.5 mm) area to find a 0.05" (1.3 mm) diameter hole.

In the along-scan direction, the hole pulse position is determined by counting the number of pixel timing pulses between the spinner encoder index mark (line timing datum) and both the leading and trailing edges of the hole pulse. In the case of this system, pixel timing is phase locked to the spinner motor encoder, but the scheme would also work using whatever pixel timing reference is used during imaging.

A cross-section of the hole position is determined by counting the number of scan lines (spinner encoder index pulses) which occur between the micro-positioner home limit switch (cross-scan datum) and the hole samples.

Using the strict relationship between the pixel clock and spinner encoder marks, it is possible to use the location of the hole for calculating the start of scan position for the 2nd image and to shift the data with respect to the original start of scan very accurately.

Figure 8:
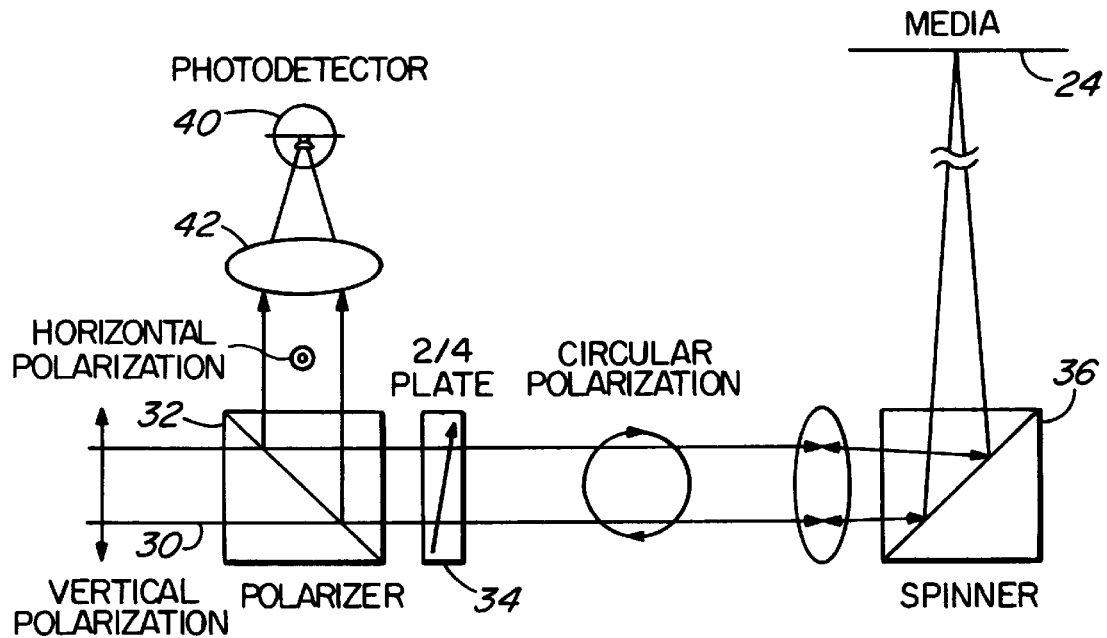
FIG. 8 is a schematical illustration of apparatus used for the accurate placement of adjacent image frames.

The optical set-up is shown in FIG. 8.

Linear polarized light 30 from the red laser is passed through a cube polarizer 32 and a λ/4 plate 34 turning the linear light into circular polarized light. The circular polarized light is focused and scanned (by means of the spinner 36 of the photographic printer) over the surface of the platen and the media 24 mounted thereon. Since the light is focused at the surface of the platen with a Rayleigh range of several millimeters, part of the impinging light is reflected into itself and available for detection of surface irregularities, like the hole 22 punched into the media. After passing through the λ/4 plate 34 a second time, the reflected light is now again linearly polarized but its polarization axis is turned by 90° with respect to the incoming light and will therefore be reflected by polarizer cube 32 onto photo-detector 40, that is used for hole detection. A lens 42 is used to collect the reflected light onto the detector 40 for enhanced efficiency.

This setup enables the detection of the hole 22 at any location around the circumference of the platen and permits the tiling of any total image length ranging from x+1/n frames, where n is a fraction of a frame. It also reduces the mechanical requirements for the frame advance since the detection is done in the scanning mode and the detector 40 is located in the beam return path and not behind the media.

The red laser is used because the photographic medium 24 is least sensitive in the red spectral region and therefore does not suffer from fogging through scattered light as would be in the case of the other wavelengths, green and blue.

Figure 7:
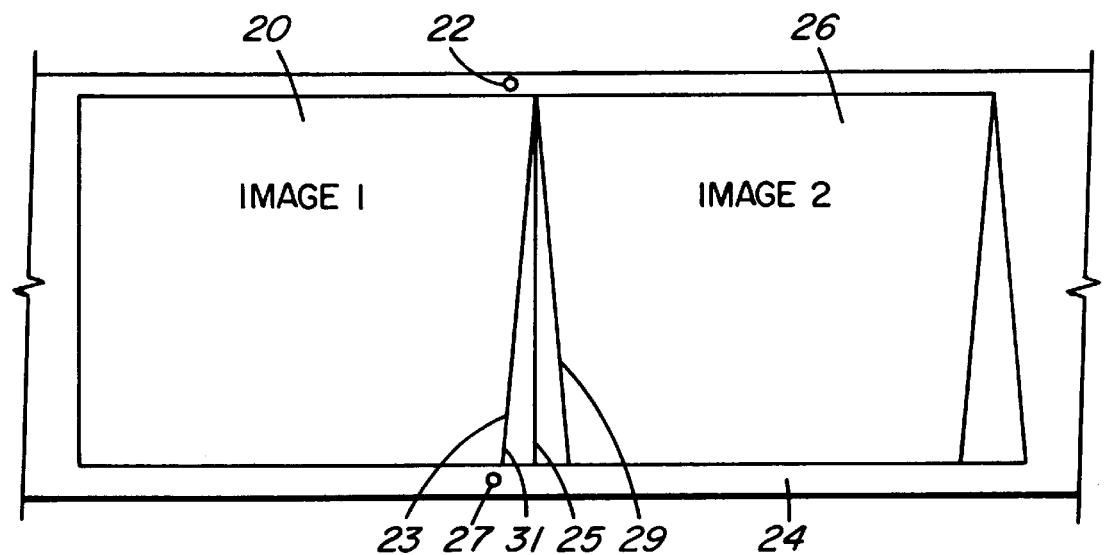
FIG. 7 is a view similar to FIG. 6 illustrating an angular displacement of two adjacent image frames.

In practise, the second image 26 can have an angular displacement with respect to the first image 20, e.g. as shown by the line 23 relative to the correctly aligned position, shown by the dotted line 25 in FIG. 7.

This angular displacement is measured by measuring the position of the hole 22 both before and after advancement of the photographic medium just prior to the exposure of the second image 26, to obtain $x_1$, $y_1$ and $x_2$, $y_2$ values, respectively. Similar measurements are effected for a hole 27 on the opposite side of the photographic medium. The difference between the shift of the hole 22 and the shift of the hole 27 in the x and y directions provides a measure of the angular displacement. This displacement can then be corrected by shifting the second image 26 by a corresponding angle in the opposite direction, as indicated by the line 29. The images 20, 26 will then be aligned as shown by the dotted line 25.

Instead of having the hole 27 on the opposite side of the photographic medium, the position of the edge of the medium on the opposite side can be detected, at a location as indicated by reference numeral 31. This edge is detected in the same way as the hole 22 is detected since the photographic medium and the platen have different reflectivities. The difference between the hole shift and the edge shift detected in the x and y direction provides a measurement of the angular displacement which can then be corrected as described above.

Since the photographic medium 24 is subjected to double exposure in the overlap region as opposed to single exposure in the remainder of the imaging area, reciprocity failure and image latency in the silver halide photosensitive material may cause density differences in the overlap region which give rise to objectionable image artifacts, the severity of which is dictated by the type and the quality of the photosensitive emulsion.

The density produced on a photographic material for a given exposure E=I*t is not independent of the exposure time t. This effect is known as reciprocity failure. There are two types of reciprocity failure which give rise to different degrees of error, i.e. at high intensity, known as High Intensity Reciprocity Failure (HIRF) and at low intensity, known as Low Intensity Reciprocity Failure (LIRF).

Since the density correction required varies with the light level or intensity, as indicated above, a method of smoothly going from the LIRF to the HIRF correction is used as follows:

$$CC = x^* \text{HIRF-correction} + (1-x)^* \text{LIRF-correction} \qquad (1)$$

where,

CC is the combined correction;

HIRF-correction is the High Intensity Reciprocity Failure correction;

LIRF-correction is the Low Intensity Reciprocity Failure correction; and x is the proportion of HIRF-correction.

The latent image on the photographic medium decays with time before it is processed. Therefore, correction may be required for two adjacent component images which were created on the photographic material 24 at different times, in order to produce a composite image which does not show density differences in the join area.

Figure 9:
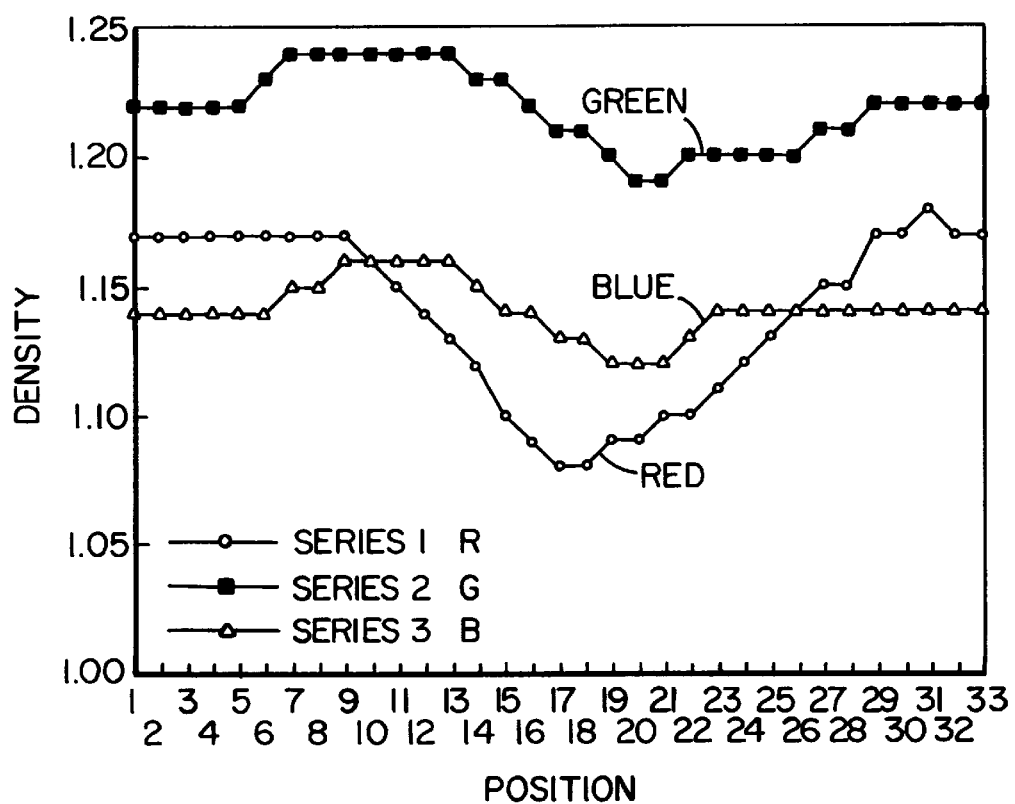
FIG. 9 is a graphical illustration of density errors in an overlap region between adjacent images on a photographic material designed for short exposure times.

In order to effect the corrections due to reciprocity failure and image latency, which will be referred to as second order corrections, the density in the blend or join area of an image produced with the first order corrections is measured, eg. by using a densitometer but not limited hereto, a scanner could also be used. The results for the measured densities across the grey blend for each of the red, green and blue, for one particular photographic material is shown in FIG. 9. Instead of straight lines, representing a perfectly uniform density, density errors occur.

The particular density errors shown in FIG. 9 are caused by a combination of HIRF and LIRF. The density error shown is of a low magnitude and is typical for materials which have been designed for short exposure times. A density error of this magnitude can be reduced to densitometer noise levels in one or two iterations using the method described below. More than one iteration is required due to dye cross-talk, i.e. where a correction of one colour disturbs the other colour values and vice versa.

Once the HIRF and LIRF corrections have been calculated, the combined correction (CC) is obtained using the equation 1 above.

Figure 10:
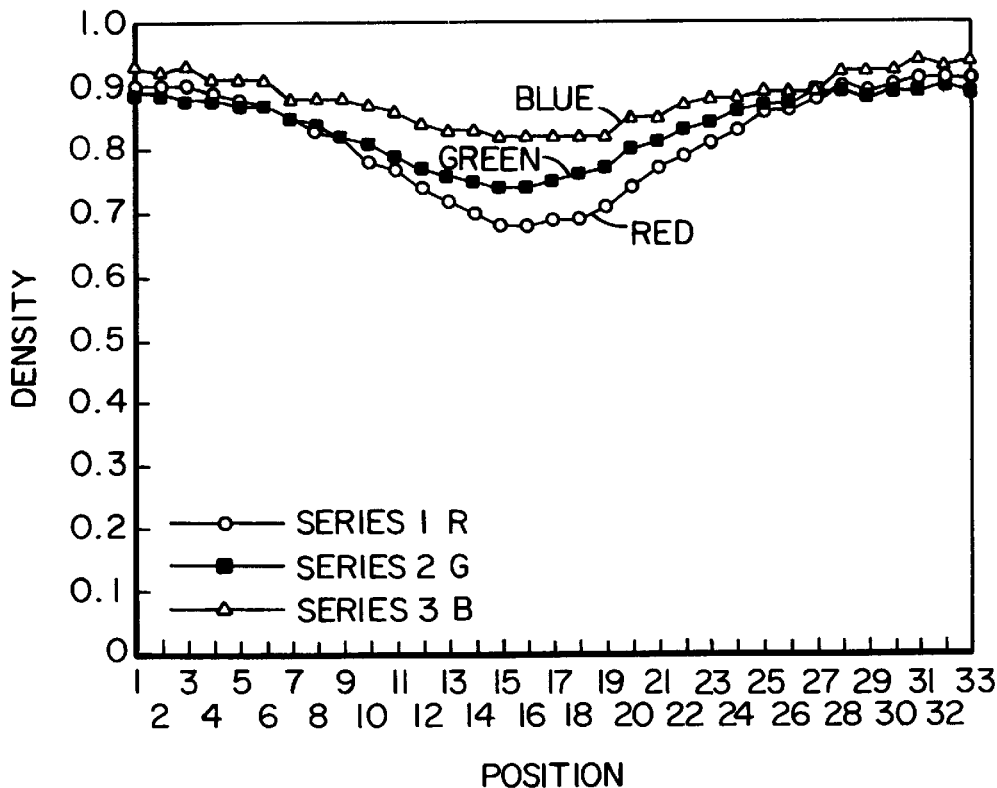
FIG. 10 is a graphical illustration similar to FIG. 9 but for a photographic material designed for longer exposure times.

For materials which have been designed for longer exposure times, a significantly larger magnitude error is measured, as for example, shown in FIG. 10. An error of this magnitude can only be reduced to densitometer noise levels by effecting several iterations.

By pre-calculating this blend characterisation in the factory (1 per supported material), with a defined linearisation target, it is then possible for a customer in the field to optimise a blend for imaging with one further iteration by output and measurement of one set of blend calibration steps.

Figure 11:
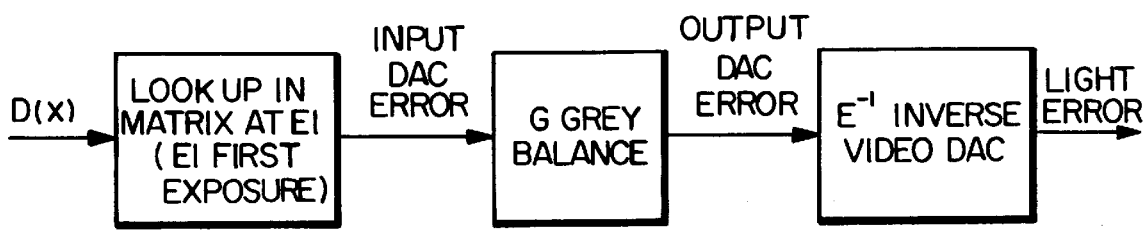
FIG. 11 is a flow diagram of a process for correcting errors due to reciprocity failure and image latency in photographic material.

A second order density correction is applied iteratively as follows:
In general for iteration n:

$$Br_0(x)+CBl_{n+1}(x)=Br_0(x)+(Bl_0(x)+Bl_{n+1}(x))+_{CBln}(x) \quad (2)$$

where,
$Bl_0(x)$ is the zero iteration left blend function;
$Br_0(x)$ is the zero iteration right blend function;
$CBl_{n+1}(x)$ is the (n+1)th iteration combined left hand blend correction to compensate for the measured density error after the nth iteration calculated as a percentage of light;
$Bl_{n+1}(x)$ is the (n+1)th iteration left hand blend correction to compensate for the measured density error after the nth iteration calculated as a percentage of light; and
$CBl_n(x)$ is the nth iteration combined left hand blend correction to compensate for the measured density error after the (n−1)th iteration calculated as a percentage of light.
And for iteration 1:

$$CBl_1(x)=(Bl_0(x)+Bl_1(x))+CBl_0(x)$$

and since, for iteration 0:

$$CBl_0(x)=0$$

this reduces to:

$$CBl_1(x)=(Bl_0(x)+Bl_1(x))$$

which is the first iteration 2nd order density correction.
$Bl_1(x)$ is calculated as shown in FIG. 11.

The measured density error, D(x) is converted to a light error, and this is negated to obtain the light correction $Bl_1(x)$. The total combined blend function $TCB_1(x)$ which is calculated, $$TCB_1(x)=Br_0(x)+(Bl_0(x)+Bl_1(x))$$

and since, $Br_0(x)+Bl_0(x)=1$,
this applies the required spatial light correction $Bl_1(x)$.
Expanding equation 2:

$$Br_0(x)+CBl_{n+1}(x)=Br_0(x)+(Bl_0(x)+Bl_{n+1}(x))+Bl_n(x) \ldots +Bl_0(x)$$

where,
$Bl_{n+1}(x)$ is the (n+1)th iteration left blend correction;
$Bl_n(x)$ is the nth iteration left blend correction;
$Bl_0(x)$ is the zero iteration left blend correction;
$Br_0(x)$ is the zero iteration right blend function;
$CBl_{n+1}(x)$ is the (n+1)th iteration combined left blend to compensate for the measured density error after the nth iteration calculated as a percentage of light.
And for iteration 2:

$$CBl_2(x)=Br_0(x)+(Bl_0(x)+Bl_2(x))+Bl_1(x)$$

and since $(Br_0(x)+Bl_0(x))=1$, the correction $Bl_2(x)$ is applied on top of $Bl_1(x)$ which was calculated in iteration 1.

In this way second order corrections can be effected where required for some photosensitive media.

Instead of effecting the second order corrections as a separate step after the first order correction; both the first and second order corrections may be effected directly in a single step responsive to density measurements in the join area after a trial run in which a composite image is formed using only the blend function in image space.

While only preferred embodiments of the invention have been described herein in detail, the invention is not limited thereby and modifications can be made within the scope of the attached claims.

What is claimed is:

1. A method of producing a composite image on an image recording medium from first and second component images, comprising the steps of:
    forming the composite image by successively exposing the recording medium to electromagnetic radiation image data of the first and second images so that the images are created on the medium in overlapping relationship to form a join region in which the medium is doubly exposed, first by the image data of the first image and then by the image data of the second image, and wherein the intensity of the electromagnetic radiation representing the first image is progressively ramped off in the join region and the intensity of the electromagnetic radiation representing the second image is progressively ramped on in the join region.

2. The method according to claim 1, wherein the image recording medium exhibits reciprocity failure or latency effects and further comprising the steps of:
    measuring the reciprocity failure or image latency effects in the join region; and
    controlling the intensity of the electromagnetic radiation image data in the join region to effect a correction of said reciprocity failure or latency effects.

3. The method according to claim 1, wherein said exposing of the recording medium is by means of image frames applied in an internal drum imaging device.

4. The method according to claim 1, wherein said exposing of the recording medium is by means of image swaths applied by means of a line imaging system.

5. The method according to claim 1, wherein the electromagnetic radiation is in the form of a laser beam.

6. The method according to claim 1, further comprising the steps of determining the position of the first component image on the image recording medium by providing a reference mark on the image recording medium and detecting the position of the reference mark for location of the second component image relative to said first component image.

7. The method according to claim 6, wherein said reference mark comprises a reference hole in the photographic medium.

8. The method according to claim 2, wherein said correction is effected by controlling the electromagnetic radiation of the second image in the joined region.

9. The method according to claim 2, wherein said measuring of the reciprocity failure or latency effects is effected by means of density measurements in the join region.

10. The method according to claim 2, wherein the image recording medium is a photosensitive material.

11. The method according to claim 2, wherein said first and second component images are represented by digital image data and further comprising the step of converting the digital image data into said electromagnetic radiation image data prior to successively exposing the recording medium to the electromagnetic radiation image data of the first and second images.

* * * * *